United States Patent [19]

Harris

[11] 4,000,725
[45] Jan. 4, 1977

[54] AFTERCOOLER COOLANT FLOW CONTROL FOR INTERNAL COMBUSTION ENGINE

[75] Inventor: Dallas R. Harris, Columbus, Ind.

[73] Assignee: Cummins Engine Company, Inc., Columbus, Ind.

[22] Filed: Mar. 24, 1975

[21] Appl. No.: 561,420

[52] U.S. Cl. .......................... 123/119 CD; 60/599; 60/611

[51] Int. Cl.² ........................................ F02B 33/44

[58] Field of Search ................. 123/119 CD, 41.31; 60/599, 611

[56] References Cited

UNITED STATES PATENTS

| | | | |
|---|---|---|---|
| 2,748,562 | 6/1956 | Kauffmann | 60/599 |
| 3,336,911 | 8/1967 | Steiger | 60/599 X |
| 3,397,684 | 8/1968 | Scherenberg | 60/599 X |
| 3,442,258 | 5/1969 | Ruger et al. | 60/599 AZ |
| 3,881,455 | 5/1975 | Belsanti | 123/119 CD |

FOREIGN PATENTS OR APPLICATIONS 950,020   2/1964   United Kingdom ......... 123/119 CD

*Primary Examiner*—Ronald H. Lazarus
*Attorney, Agent, or Firm*—Gary M. Gron; Robert T. Ruff

[57] ABSTRACT

The disclosure illustrates an air breathing liquid cooled compression ignition engine having a turbocharger and an aftercooler connected to the engine cooling system to lower the temperature of air compressed by the turbocharger. The engine cooling system includes a centrifugal pump having a pressure output that increases with increasing engine RPM. In order to minimize the generation of smoke during transient acceleration from idle, a flow control valve responsive to pressure differentials permits engine coolant flow through the aftercooler only when the engine is in its normal operating range above idle. The valve prevents the aftercooler from heating the intake air when the air delivered to the aftercooler during idle is lower than the temperature of the engine coolant.

7 Claims, 3 Drawing Figures

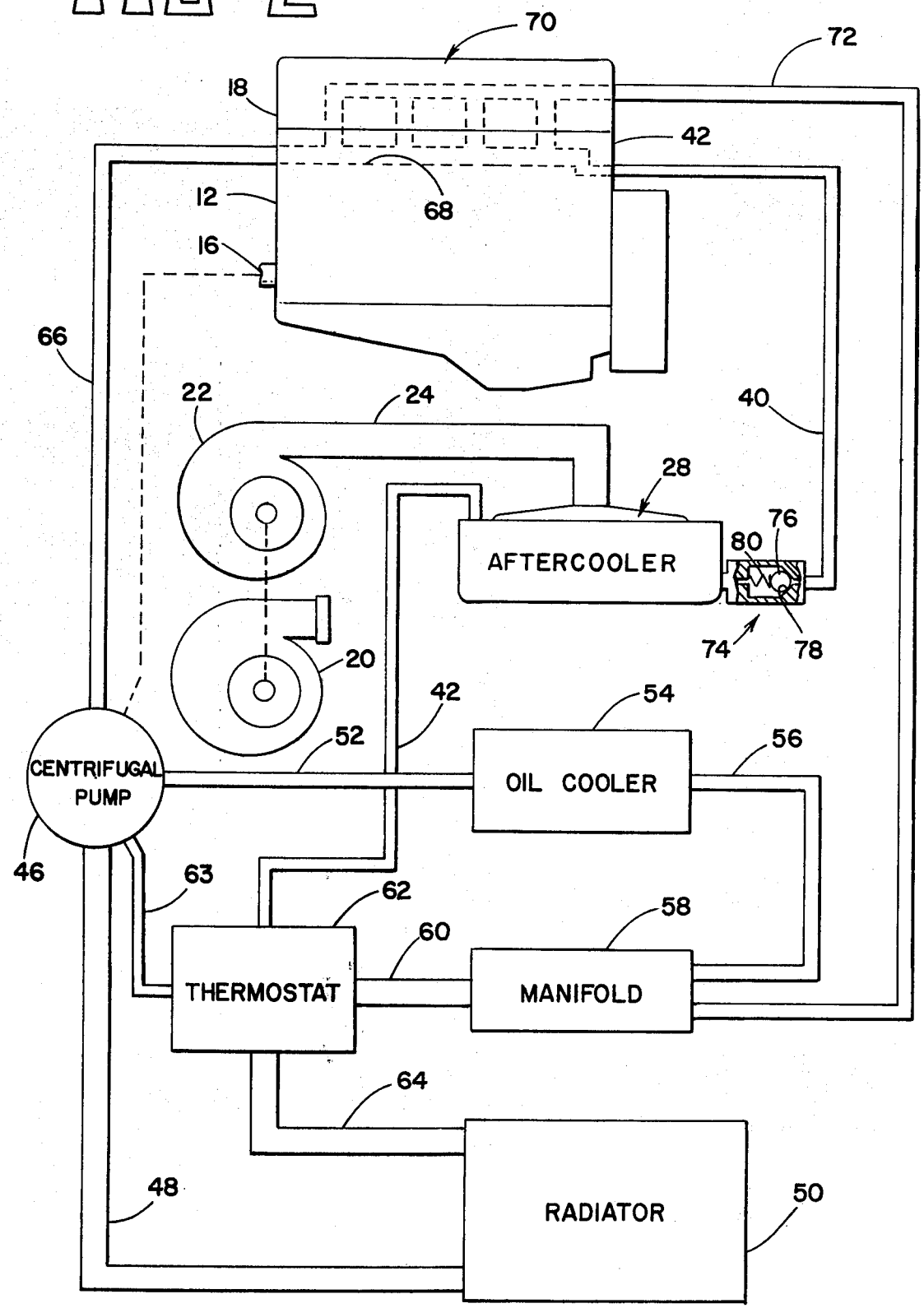

AFTERCOOLER COOLANT FLOW CONTROL FOR INTERNAL COMBUSTION ENGINE

The present invention relates to cooling systems for internal combustion engines and more specifically to cooling systems for engines having an aftercooler.

As the compression ignition (diesel) engine has evolved over the years, it has been found that several components produce significant increases in available power. One of these components is an exhaust driven turbocharger which uses the energy in the exhaust gases to drive a compressor. The compressor pressurizes and therefore increases the density of the air delivered to the engine cylinder.

For further increases in density another component called an aftercooler has been used. This is a heat exchanger positioned between the compressor and the engine to take heat out of the heated compressor discharge air. By cooling the air the charge density is increased thereby permitting a maximum volumetric efficiency for maximum engine performance.

For liquid cooled engines it is convenient to use the coolant in an air-to-water aftercooler. This produces highly effective aftercooling during normal engine operation. Under full load conditions, the compressor discharge air may have a temperature on the order of 400°–500°. An aftercooler utilizing engine coolant at approximately 170° reduces the air temperature to the engine to approximately 220° with a corresponding increase in density. Thus, we see that significant performance benefits may be realized with an aftercooler of this type.

During certain engine operating conditions, however, the above system may encounter an emission related problem. After an engine has idled for a period of time, the turbocharger is operating at a RPM which produces very little pressure boost to the intake air passing to the engine. Under this condition it is acting essentially as a naturally aspirated engine. Since the intake air is not significantly compressed, its temperature remains relatively close to the ambient temperature, approximately 85° fahrenheit to the aftercooler. Since the engine coolant temperature remains at 170°, the aftercooler is actually heating the intake air during this period, thus, raising the air temperature to the engine to approximately 165°. When an operator advances the throttle to start a vehicle in motion, the engine accelerates faster than the turbocharger can respond. During this condition the aftercooler continues to heat the air.

The heating of the air has an adverse effect on the volumetric efficiency of the engine. This in turn causes an increase in the amount of smoke emitted by the engine for a given torque output level. Put in different terms, a highway vehicle must meet certain Federal requirements of minimum smoke emission. To meet this level with a system of the above type, the torque output must be cut back during this transient condition thereby reducing the available torque to get a heavily loaded vehicle in motion.

In the past, various approaches have been taken to control the aftercooler temperature by controlling its coolant's flow. Examples of prior art approaches may be found in the patents to Kauffmann, U.S. Pat. No. 2,748,562; Kelgard, U.S. Pat. No. 3,018,617; Gratzmuller, U.S. Pat. No. 3,450,109.

These patents show various systems in which coolant flow through an aftercooler is regulated by rather complicated temperature sensing systems to terminate coolant flow when aftercooling is not needed. They do not do this in an attempt to minimize smoke. Even if they were employed on an engine, however, they would lack the simplicity, durability and reliability necessary for highway-type truck engines.

The above problems are solved in a liquid cooled aftercooler of the above general type by using a pressure responsive flow control valve which permits coolant flow through the aftercooler only when a predetermined pressure differential across the valve is exceeded. This pressure corresponds to a cooling system pump output at an engine RPM above idle. Thus heating of the air by the aftercooler during idle is prevented thereby increasing volumetric efficiency during engine acceleration.

The above, and other related features of the present invention will be apparent from a reading of the following description of the drawings and the novelty thereof pointed out in the appended claims.

In the drawings:

FIG. 2 is a schematic drawing of the engine of FIG. 1 along with the liquid coolant system for the engine.

Figure 1:
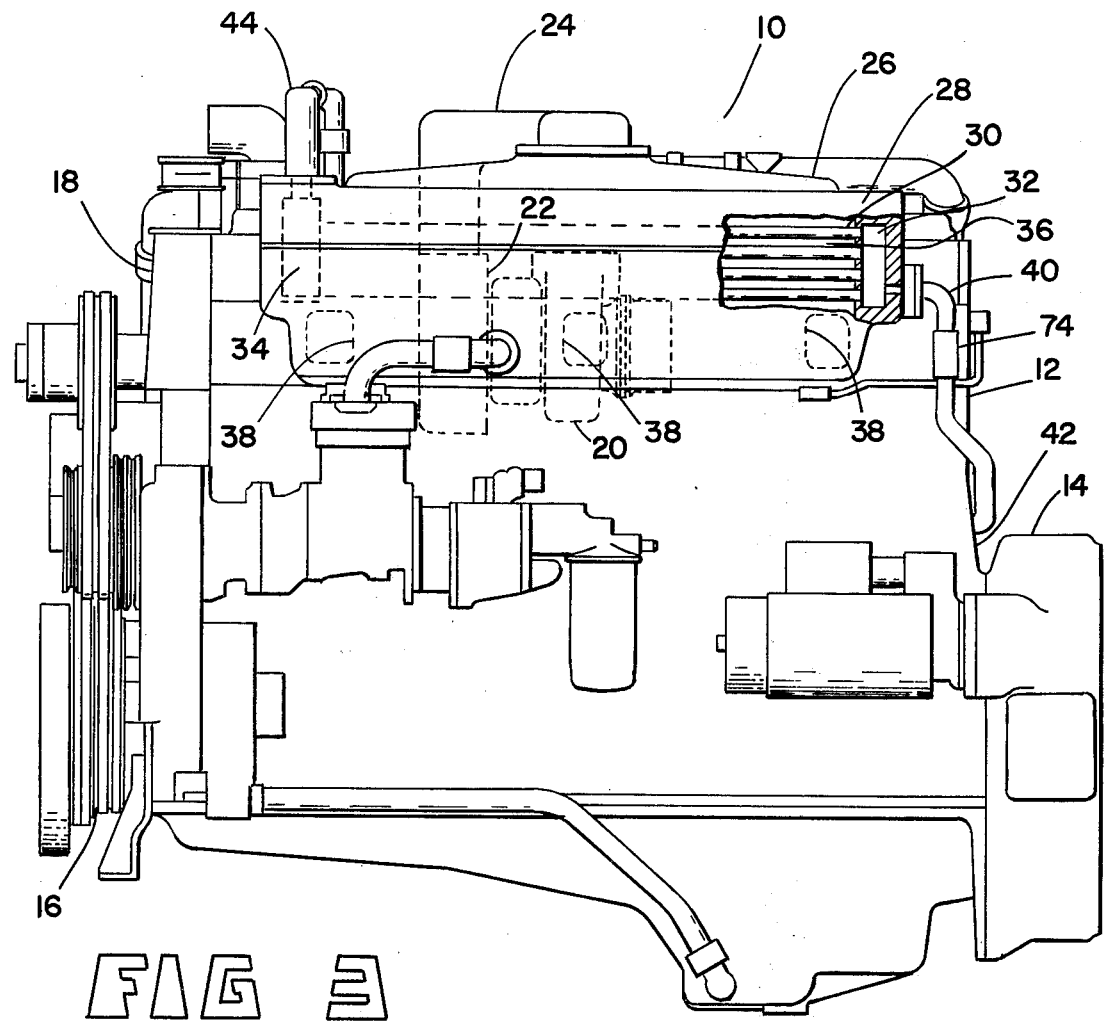
FIG. 1 is a side elevation view of a compression ignition engine with which the present invention is used.

FIG. 1 illustrates a reciprocating internal combustion engine 10 of the compression ignition type commonly known as a diesel. The operation of diesel engine 10 is so well known that its components need not be explained in detail, except for their relationship with the present invention. Engine 10 comprises a block 12 having a series of cylinders which receive reciprocating pistons (both are not shown). These pistons are connected to a crankshaft to produce a rotary power output through a series of accessory drive pulleys 16 at the front of the engine. A cylinder head 18 is mounted on top of the block 12 and contains intake and exhaust valves (both not shown) to produce synchronized intake and exhaust of gases from the cylinders. Suitable fuel injection nozzles (not shown) inject metered quantities of fuel into the cylinders when the air has been heated to a level where its temperature is sufficient to ignite the fuel.

In order to increase the available power from the engine, a turbocharger 19 is employed. The turbocharger 19 comprises a turbine 20 connected to and driven by exhaust gases from the engine 10. The turbine 20 drives a compressor 22 which receives ambient air and pressurizes it for delivery through a transfer conduit 24 to a housing 26 serving as an aftercooler housing and engine intake manifold.

An aftercooler 28 is positioned within housing 26 and comprises a bundle of tubes 30 extending from an intake header 32 at the aft end of housing 26 to an outlet header 34 at the forward end of housing 26. The spaces between the outer diameters of tubes 30 define a first set of passages 36 permitting flow of air from the transfer conduit 24 downward through the tubes 30 to engine intake ports 38 in head 18. Engine intake ports connect with the cylinder heads via the intake valves mentioned above. The inner diameters of tubes 30 define a second set of passages that are in heat exchange relationship with the first set of passages 36. This is usually accomplished by using a highly conductive material for the tubes such as brass or copper. As described below, the second set of passages are supplied with liquid coolant from a liquid coolant system for engine 10 coolant passes through a conduit 40 extending from the aft end 42 of block 12 to header 32. The outlet header 34 connects with a second conduit 44 functioning to return coolant to the engine cooling system described in simplified form in FIG. 2.

Referring to FIG. 2 the engine cooling system comprises a centrifugal pump 46 mechanically driven from the engine crankshaft. The mechanical connection may be through a belt and pulleys or through a set of gears. Pump 46 receives liquid coolant from a supply line 48 extending to a radiator 50. Radiator 50 is of the usual air-to-water type in which air is directed across a series of heat exchange passages containing coolant. Air passes through the radiator by the forward motion of a vehicle or by an engine driven fan (not shown). The output of the pump passes through several cooling circuits.

The first includes a passage 52 extending to an oil cooler 54. Oil cooler 54 uses the liquid engine coolant to maintain the engine oil passing through the cooler 54 at a safe maximum level. A coolant return line 56 extends from the oil cooler 54 to a return manifold 58 connected by passage 60 to a thermostat housing 62. Thermostat housing 62 circulates coolant either directly to centrifugal pump 36 via line 63 or through line 64 to radiator 50 depending upon the system temperature.

A second cooling circuit from pump 46 begins with passage 66 leading to internal passages 68 in block 12. These passages 68 surround the cylinder walls of the engine 10 and connect with a series of passages 70 in head 18 for further cooling of the valves and injector mechanism. The main portion of the flow into block 12 passes through return conduits 72 (only one of which is shown) to the coolant return manifold 58. A secondary flow passes from passages 68 through the aft face 42 of block 12 to the aftercooler supply conduit 40. As mentioned above, the coolant flow from conduit 40 passes through the tubes 30 in aftercooler 28 to return conduit 44 leading to the thermostat housing 62.

In accordance with the present invention a check valve 74 is positioned in supply conduit 40 to control the flow of coolant through aftercooler 28. Check valve 74 comprises a valve element 76 urged against a seat 78 by a spring 80. Spring 80 has a predetermined spring constant to permit flow through the valve 74 only when the pressure difference in the system between supply conduit 40 and return conduit 44 is above a predetermined level. The valve 74 may take numerous forms including those that are commercially available. One such valve that may be employed is Model M-400 check valve manufactured by Strataflo Products, Inc., Fort Wayne, Ind.

The predetermined opening pressure difference of valve 74 will be explained during a discussion of the operation of the engine cooling system. During operation of engine 10, centrifugal pump 46 pressurizes coolant for delivery through the various circuits to cool the different engine components. When the engine 10 is operating near or at a full throttle condition, the air coming from the air compressor 22 is at a highly elevated temperature. Flow of coolant through the aftercooler tubes 30 lowers the air temperature for increase of volumetric efficiency. When, however, the engine is brought to an idle condition, the turbocharger compressor 22 has a very low RPM and a negligible boost pressure. Under this condition the air delivered to the aftercooler 28 approaches ambient temperature. With a continued flow of liquid coolant through the aftercooler the air passing through would be heated, thus, reducing the volumetric efficiency of engine 10. However, the valve 74 is set so that at approximately an idle condition, flow through aftercooler 28 is prevented thereby eliminating the heat input. Valve 74 is set to control flow as described below.

Figure 3:
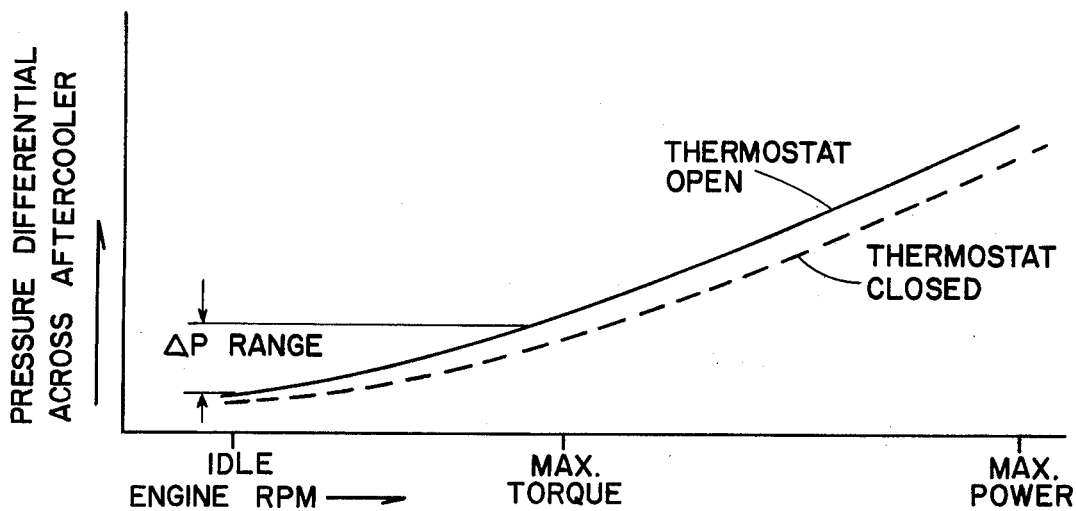
FIG. 3 is a graph illustrating the pressure output vs. RPM curve for a liquid coolant circulation pump in the system shown in FIG. 2.

The centrifugal pump has a flow and pressure characteristic which increases with increasing RPM. In the system shown in FIG. 2, the increasing flow through various engine coolant flow paths creates pressure differences at various points in system. FIG. 3 illustrates the pressure differential between conduits 40 into aftercooler and 44 out of aftercooler as a function of RPM. These pressure differentials are increasing with increasing RPM.

The opening pressure difference of the spring 80 is selected so that it will fall within a range of pressure differences (see FIG. 4) defined at an upper limit by the pressure difference existing at an RPM just below maximum engine torque with the thermostat closed to a lower limit at an RPM just above idle with the thermostat open. The range of opening pressure differences permits fairly wide manufacturing tolerances in the valve 74 thereby greatly minimizing its cost. A range can be placed on the opening of the check valve because the important objective is to have the valve closed at idle, thus, preventing aftercooler coolant flow. The requirement to reestablish aftercooler coolant flow takes place in the region above maximum torque output where the boost pressure of the compressor is significant. As long as the valve 74 is reopened somewhere between idle and the maximum torque, the cooling function will still be available when it is needed.

There is a dramatic effect on engine performance with the simplified flow control valve 74 described above. In comparisons between an identical engine equipped and not equipped with the valve 74, the engine so equipped had up to 20% more torque output at initial acceleration for a given smoke limited output. This has a significant effect on engine performance since it substantially increases the torque available to put a vehicle in motion but still maintains stringent control on white smoke emissions. The valve 74 not only is economical to manufacture, but it may conveniently be employed in the cooling circuit of any liquid-cooled and aftercooled engine.

A preferred embodiment of the present invention has been described, however, it is not intended to limit its spirit and scope.

I claim:

1. In an air breathing liquid cooled internal combustion engine operable between a relatively low idle RPM and at a higher RPM, the combination comprising:
   an engine cooling system including means defining a plurality of liquid coolant flow paths,
   an engine driven pump pressurizing liquid coolant for flow through said plurality of flow paths at a level increasing generally with increasing engine RPM.
   a compressor for pressurizing engine intake air, said compressor having an outlet,
   means responsive to operation of said engine for rotating said compressor,
   a heat exchanger having a first set of passages receiving air from said compressor outlet for delivery to said engine and a second set of passages in heat exchange relation to said first set of passages, said second set of passages connected to and receiving liquid coolant from said engine cooling system for flow therethrough; and a pressure responsive flow control valve permitting coolant flow through said second set of heat exchanger passages in response to liquid pressure differentials across said heat exchanger exceeding a predetermined level, said pressure differential corresponding to a condition when said engine is operating above said idle RPM.

2. Apparatus as in claim 1 wherein said engine has a plurality of parallel coolant circuits defined by said flow path means and wherein said apparatus further comprises means for connecting said second set of heat exchange passages in parallel flow relation to one of said coolant flow path means.

3. Apparatus as in claim 1 wherein said engine driven pump is a centrifugal pump.

4. Apparatus as in claim 3 wherein:

said liquid coolant flow path means define parallel cooling circuits each connected at one end to the output of said centrifugal pump; said apparatus further comprises means for connecting said second set of heat exchanger passages in parallel flow relation to one of said coolant flow path means.

5. Apparatus as in claim 4 wherein:

said engine has a block in which reciprocating cylinders are positioned;

said one coolant flow path means comprises passages extending from one end to the opposite end of said engine block, said one end being connected to the output of said pump;

said connecting means comprises a conduit extending from the passages in the opposite end of said block to said second set of heat exchanger passages.

6. Apparatus as in claim 5 wherein said flow control valve is interposed in said conduit and is responsive to pressure in said conduit upstream of said valve.

7. Apparatus as in claim 1 wherein said engine has a RPM operating range including idle, a condition of maximum torque output and a condition of maximum horsepower output and wherein said predetermined pressure is selected as the level experienced at an engine RPM range above idle and below said condition of maximum engine torque.

* * * * *